United States Patent [19]

Dinitz

[11] Patent Number: 5,049,001
[45] Date of Patent: * Sep. 17, 1991

[54] SAFETY ROADWAY DELINEATOR EFFECTIVE DURING RAINY NIGHT-TIME DRIVING CONDITIONS

[75] Inventor: Arthur M. Dinitz, New Rochelle, N.Y.

[73] Assignee: Transpro Industries, Inc., New Rochelle, N.Y.

[*] Notice: The portion of the term of this patent subsequent to Sep. 20, 2005 has been disclaimed.

[21] Appl. No.: 247,001

[22] Filed: Sep. 20, 1988

Related U.S. Application Data

[63] Continuation-in-part of Ser. No. 1,890, Jan. 9, 1987, Pat. No. 4,772,155.

[51] Int. Cl.$^5$ .............................................. E01C 11/22
[52] U.S. Cl. ........................................ 404/7; 404/14; 404/6
[58] Field of Search .......................... 404/6-9, 404/12-16; 256/1, 13.1; 350/97, 100-107

[56] References Cited

U.S. PATENT DOCUMENTS

| | | | |
|---|---|---|---|
| 2,345,644 | 4/1944 | Weber | 350/105 |
| 3,037,433 | 6/1962 | Maher | 52/98 |
| 3,203,327 | 8/1968 | Daley | 404/7 |
| 3,396,639 | 8/1968 | Lemelson | 404/8 |
| 4,000,882 | 1/1977 | Penton | 404/16 |
| 4,348,133 | 9/1982 | Trent et al. | 404/73 |
| 4,609,587 | 9/1986 | Giordano et al. | 350/105 X |
| 4,772,155 | 9/1988 | Dinitz | 404/6 |

FOREIGN PATENT DOCUMENTS

| | | | |
|---|---|---|---|
| 2459500 | 6/1976 | Fed. Rep. of Germany | 404/7 |
| 1093411 | 5/1955 | France | 404/9 |
| 1291739 | 3/1962 | France | 404/7 |
| 1602242 | 9/1970 | France | 404/7 |
| 2557896 | 7/1985 | France | 404/14 |
| 401337 | 11/1933 | United Kingdom | 404/7 |
| 450866 | 7/1936 | United Kingdom | 404/9 |
| 453269 | 9/1936 | United Kingdom | 404/9 |
| 492788 | 9/1938 | United Kingdom | 404/7 |
| 497245 | 12/1938 | United Kingdom | 404/7 |
| 500680 | 2/1939 | United Kingdom | 404/7 |
| 513358 | 10/1939 | United Kingdom | 404/7 |
| 540023 | 10/1941 | United Kingdom | 404/12 |
| 613077 | 11/1948 | United Kingdom | 404/7 |
| 1209646 | 10/1970 | United Kingdom | 404/7 |
| 2118999 | 11/1983 | United Kingdom | 404/14 |

Primary Examiner—Jerome W. Massie, IV
Assistant Examiner—Gay Ann Spahn
Attorney, Agent, or Firm—Brooks Haidt Haffner & Delahunty

[57] ABSTRACT

A safety roadway delineator includes one or more elongate recessed marker surfaces which are coated with a reflective material, preferably a retroreflective material such as reflective glass beads. The recessed marker surfaces are vertical or at least inclined to the horizontal to insure water run-off and are formed either directly in cast-in-place concrete roadway members or in pre-cast polymer concrete facing panels which are attached to the cast-in-place concrete roadway members. The roadway delineator is substantially continuously protected from normal wear and reliably exhibits reflectivity both under dry and rainy weather conditions.

12 Claims, 5 Drawing Sheets

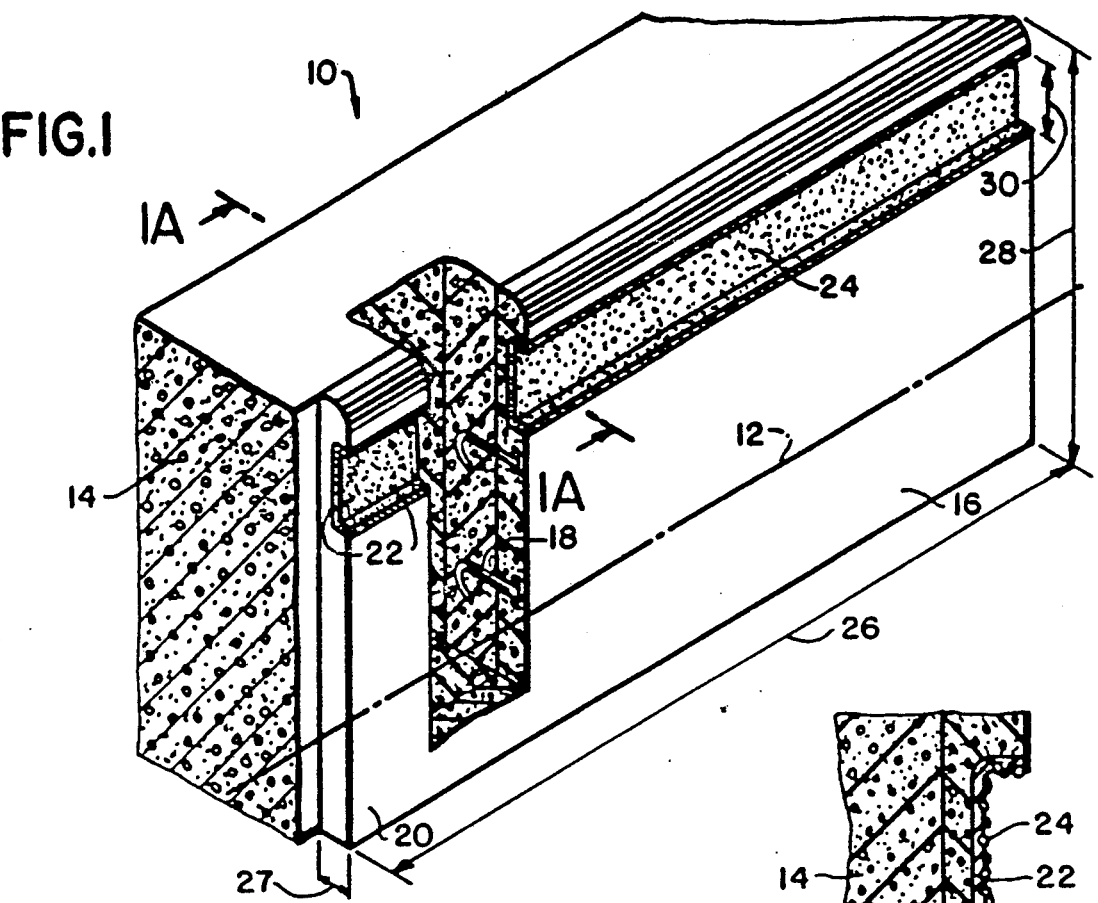
FIG.1
FIG.1A
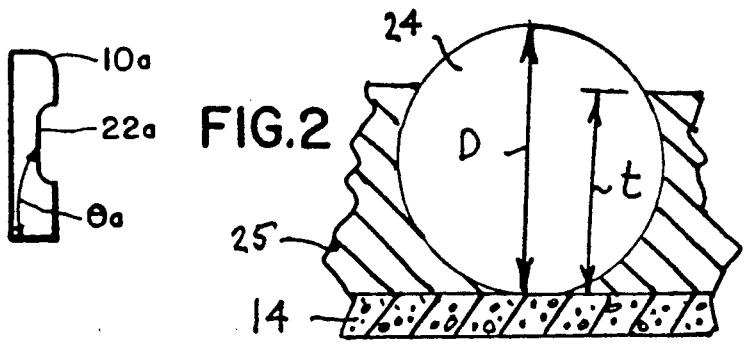
FIG.2
FIG.1B
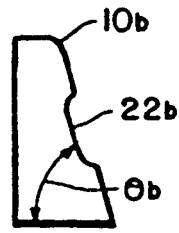
FIG.3
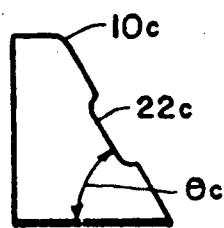
FIG.4
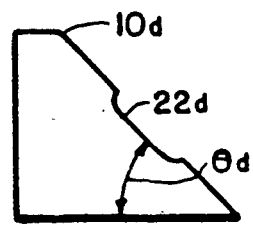
FIG.5

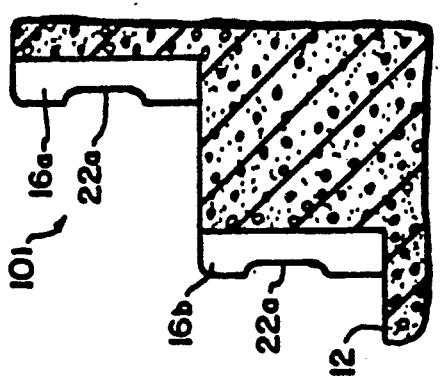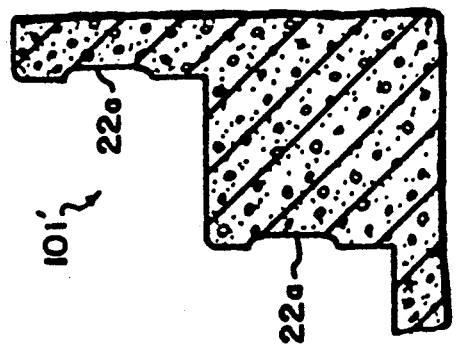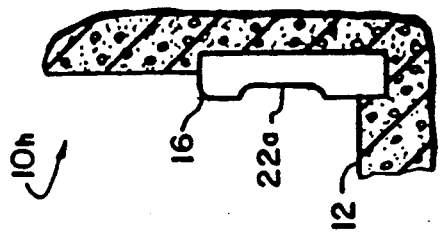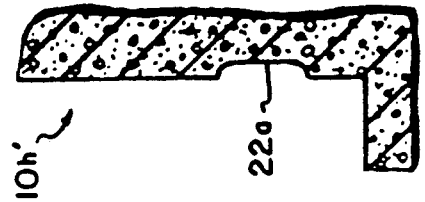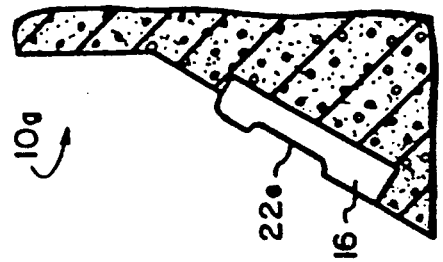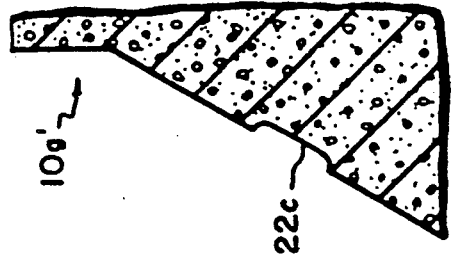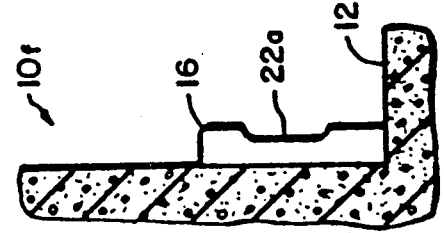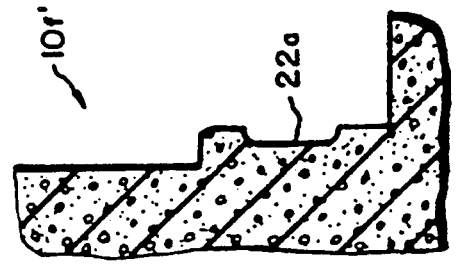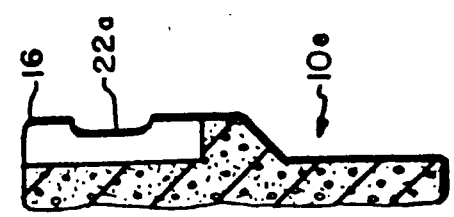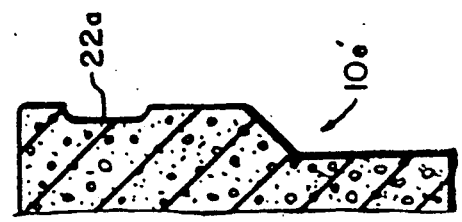

SAFETY ROADWAY DELINEATOR EFFECTIVE DURING RAINY NIGHT-TIME DRIVING CONDITIONS

CROSS REFERENCE TO RELATED APPLICATIONS

This application is a Continuation-In-Part (CIP) of U.S. application Ser. No. 001,890, filed Jan. 9, 1987, issued as U.S. Pat. No. 4,772,155 on Sept. 20, 1988.

BACKGROUND OF THE INVENTION

1. Field of the Invention

The invention generally relates to highway structures and more specifically to a safety roadway delineator which is substantially immune from normal wear and reliably exhibits reflectivity both under dry and rainy night-time weather conditions and method of making the same.

2. Description of the Prior Art

Reflective stripes and other markings have been provided on highways and highway structures, such as curbs and median barriers, in order to delineate or identify the boundaries of a highway or to divide lanes on a multi-lane highway. One of the major problems with such delineators has been their visibility under different driving or weather conditions, on the one hand, and the durability of such markings or stripes, on the other hand.

While such delineators function properly and efficiently under ideal driving or weather conditions, their usefulness frequently deteriorates during inclement weather, particularly when it rains. Under such adverse conditions, the delineators are frequently not clearly visible and this poses a danger or hazard to those using the highway or road. The problem and the need for a solution have been discussed by transportation engineers and others who are involved with the design, construction and maintenance of highways. See, for example, "ITE Hearing Record—Performance Standards For Retroreflectivity Of Traffic Control Devices", Institute of Transportation Engineers, Aug. 21, 1985; and "Operation, Safety and Maintenance Of Transportation Facilities", Transportation Research Circular No. 306, June, 1986, Transportation Research Board, National Research Council. In the foregoing publications, there is discussed the need to improve markings for highways, particularly under wet or rainy night-time driving conditions.

With the introduction of relatively durable paints and applied plastics, along with the advent of retroreflective glass microspheres, a partial solution to night-time traffic delineation has become available. However, these techniques still have certain drawbacks. For example, reflective markers or delineators which are exposed to normal traffic will wear down or be adversely effected by inclement weather, road salt and corrosive and chemical attack, and mechanical snow removal equipment. Additionally, during wet or rainy weather driving conditions, water causes the refractive and reflective light indices to change for both reflective beads and the base materials. In some cases, the wetting of such reflective materials cause the total visual disappearance of the demarcation elements. Such visual deviation is due to a "mirror" effect of the headlights impinging upon the water on the reflective material instead of directly on the reflective material itself. All of these disadvantages are true not only of roadways, but also curbs, median dividers, and other traffic routing devices.

Numerous solutions have been proposed for achieving the goal of providing a reliable highway delineator which functions satisfactorily both during ideal as well as during inclement weather conditions. For example, in U.S. Pat. No. 2,345,644, issued to Weber on Apr. 4, 1944, there is described a light reflecting sign or marker which utilizes a Portland cement base poured on site and relatively large glass reflective beads are imbedded in a pre-cast panel of white Portland cement which is imbedded in the cement curb. However, the panel is disposed at the exterior surface of the cement base which is exposed to the vehicular traffic. The glass beads, in fact, project beyond the surface and, therefore, are susceptible to contact with vehicles and, therefore, the probability that such glass reflective beads will be dislodged is substantial.

In U.S. Pat. No. 3,203,327, issued to Daley on Aug. 31, 1965, a cast metal street curb is disclosed which includes vertical ribs or recesses. Although the patentee does not show reflective material within such recesses, he does mention that it is possible to provide paint or a similar finish in order to enhance the visibility of the curb to motorists at night. However, Daley does not teach or suggest the use of elongate horizontal delineators which run generally parallel to the road and which are recessed and provided with retroreflective materials in order to enhance the amount of reflection under adverse weather conditions.

U.S. Pat. No. 4,000,882, issued to Penton on Jan. 4, 1977, discloses a contrasting marker panel for highway guardrails. Penton intends, however, to utilize his invention with the most commonly used form of continuous guardrail which is formed of sheet iron or steel. Penton utilizes a marker panel which is receivable within the trough of the guardrail and covered with a plastic film. Penton suggests that such plastic film may sometimes be reflectorized and also suggests that a reflector or reflectors may, in certain instances, be mounted within the trough so as to be exposed outwardly of the guardrail recess.

The Penton marker panel is not, however, suitable for use in connection with other highway safety structures, particularly those made of cast-in-place concrete or pre-cast elements.

SUMMARY OF THE INVENTION

One object of the invention is to provide a roadway delineator which overcomes the disadvantages inherent in prior art reflective markers and delineators.

It is another object of the present invention to provide a roadway delineator which is simple in construction and inexpensive to manufacture It is still another object of the present invention to provide a roadway delineator which is substantially immune from normal wear.

It is yet another object of the invention to provide a roadway delineator of the type under discussion which will provide reliable reflectivity and guidance for vehicular traffic in rain and night-time conditions.

It is a further object of the invention to provide a roadway delineator which can be used in a variety of applications and with different roadway structures.

It is still a further object of the invention to provide a roadway delineator which has a great deal of flexibility and can be incorporated into highway structures both on site or in pre-cast structures which can be brought to the site.

It is an additional object of the invention to provide a roadway delineator which can be used with a variety of different reflecting materials, and particularly with retroreflective materials.

In order to achieve the above objects, as well as others which will become apparent hereafter a safety roadway delineator in accordance with the present invention comprises an elongate roadway member forming a barrier which extends along and at least partially defines the roadway. The roadway member has an exterior surface which faces the roadway and is exposed to the roadway traffic. Said roadway member is provided with a generally elongate marker surface recessed in relation to said exterior surface. Said marker surface extends along the length direction of said roadway member and is inclined in relation to the horizontal to cause water run-off. Reflection means is provided which is applied to said recessed marker surface for at least partially reflecting incident light in the direction of the source of incident light on the roadway. In this manner, said roadway member forms a substantially continuous reflective delineator which is protected from normal wear and reliably exhibits reflectivity both under dry and rainy weather conditions.

Advantageously, the safety roadway delineator in accordance with the invention utilizes a retroreflective material, such as glass microspheres which are set into a very durable material whose adherence depends both on a chemical as well as a mechanical bond. The base material into which the reflective material is set advantageously exhibits outstanding strength characteristics as well as being chemical and weather resistant. As noted, further protection from physical damage to the microspheres is attained by recessing the implant so as not to have the retroreflective area within the proximity of normal wear due to scraping tires, wheel rims, road sweeping vehicles or snow removal equipment.

An important feature of the present invention is that the recessed surface to which the reflective material is applied is vertical or inclined in relation to the horizontal to cause water run-off and insure that the reflective material is not subjected to the "mirror" effect and a deterioration of the reflective characteristics due to rain or wet conditions, this insuring continued safe nighttime driving during inclement or rainy weather conditions.

The invention provides continuous edge, or island, or bridge demarcation and is helpful to minimize depth perception difficulties encountered with other prior approaches.

BRIEF DESCRIPTION OF THE DRAWINGS

For a better understanding of the invention together with other and further objects, features and advantages thereof, as well as other characteristics of various embodiments thereof, reference is had to the following description taken in conjunction with the accompanying drawings in which:

FIG. 1 is a perspective view of a pre-cast reflective polymer concrete curb form in accordance with the present invention, partially broken away to illustrate how the pre-cast concrete section is attached to a cast-in-place concrete structure;

FIG. 1A is an enlarged cross-sectional view of the curb shown in FIG. 1, taken along line 1A—1A;

FIG. 1B is an enlarged side elevational view of one glass bead or microsphere, showing how the same are embedded within a binding matrix in accordance with the invention;

FIGS. 2-5 illustrate different angles of inclination in relation to the horizontal of the recessed marker surfaces, each of which provides desired water runoff;

FIGS. 6-10 illustrate different roadway members made of cast-in-place concrete and provided with precast facing panels formed with the recessed marker surfaces, all of the elongate marker surfaces being vertical with the exception of the one shown in FIG. 8, which is inclined at approximately 45° to the horizontal. FIG. 10 also illustrates the use of two pre-cast members spaced one above the other on the concrete road structure to provide two reflective roadway delineators one above the other:

FIGS. 11-15 illustrate roadway members similar to those shown in FIGS. 6-10, respectively, but showing the elongate marker surfaces formed directly in the cast-in-place concrete roadway members and not on separate pre-cast elements or facing panels;

DESCRIPTION OF THE PREFERRED EMBODIMENTS

Figure 16:
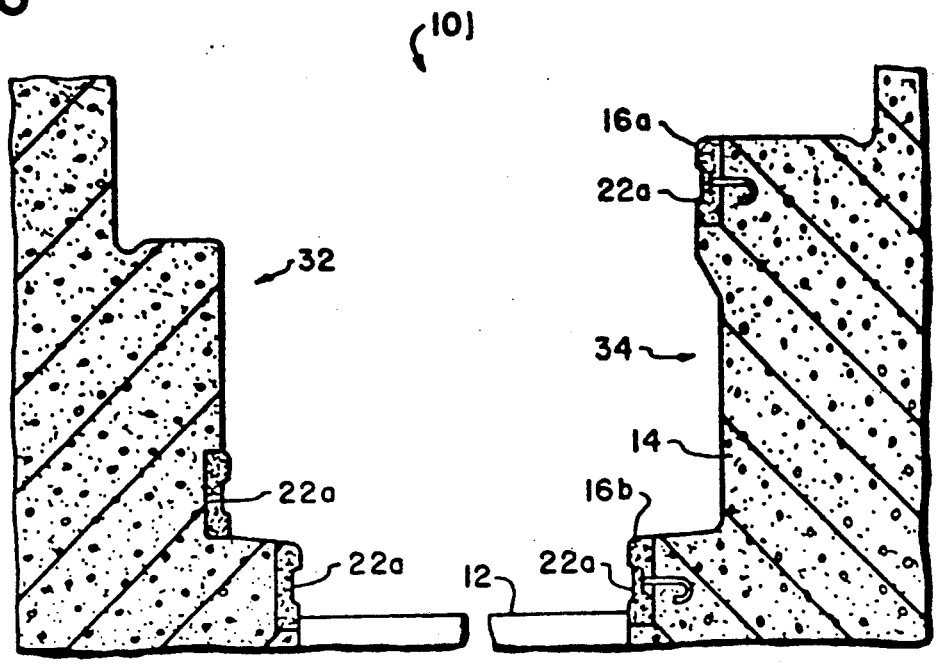
FIG. 16 is a front elevational view of typical low and high bench panels used in tunnel constructions, illustrating the manner in which the present invention is incorporated in pre cast polymer concrete members which are attached to cast-in-place concrete structures.

Referring now specifically to the figures, in which identical or similar parts are designated by the same reference numerals throughout, and first referring to FIG. 1, a roadway member in accordance with the present invention is generally designated by reference numeral 10.

The roadway member 10 forms a barrier which extends along and at least partially defines the roadway 12. Specifically, the roadway member 10 shown in FIG. 1 is a curb which can be made in any known or conventional way and is shown in FIG. 1 to be formed of cast-in-place regular concrete 14. In accordance with the present invention, there is provided a pre-cast member or element 16 which is attached to the concrete member 14 by means of anchors 18 or in any other known or conventional manner.

As will become apparent hereafter, the specific material from which the element 16 is formed is not critical. However, it is presently preferred that the element or member 16 be of reinforced pre-cast polymer concrete. It has been found that polymer concrete is particularly suitable for the intended purpose. Polymer concrete is a hybrid product which exhibits improved performance characteristics over regular concrete or cementitious materials. Polymer concretes are generally lighter in weight, exhibit increased tensile and compresive strength, and generally have a higher resistance to moisture and other corrosive elements. Polymer concrete does not contain cement and is made up of various binders, such as polyesters of numerous types of long chain monomers, epoxies, methyl methacrylates, urethanes and vinylesters. Because the viscosities of these binders differ, the amounts, sizes and proportions of the fill may vary with each particular polymer. Thus, determining which binder to use is usually based on strength desired and cost considerations. Different polymer concretes can be used in connection with the present invention, with different degrees of advantage Polymer concrete produced by Transpo Industries, Inc., Castek Division, has been successfully used to produce the pre-cast polymer concrete roadway delineators in accordance with the invention. Polymer concretes are discussed in a brochure entitled "Polymer Concrete—The State Of the Art", an information bulletin from Transpo Industries, Inc., the Assignee of the subject application.

Still referring to FIG. 1, the roadway member 10 is an elongate member the length direction of which extends substantially parallel to the roadway 12. The pre-cast polymer concrete member or facing panel 16 has an exterior surface 20 which faces the roadway 12 and is exposed to roadway traffic. A generally elongate marker surface 22 is provided on the facing panel 16 recessed in relation to the exterior surface 20. The marker surface 22 preferably forms an elongate line which extends along the length direction of the facing panel 16 and is inclined in relation to the horizontal to cause water run-off. In the roadway member 10, the recessed marker surface 22 is in a vertical plane or inclined 90° in relation to the horizontal. This configuration, clearly, provides maximum water run-off. However, smaller angles can be used with similar advantage. Although the recessed marker surface 22 is shown as a continuous line in FIG. 1, as well as in the remaining figures, it should be clear that the present invention also contemplates a continuous marker surface which is intermittently or periodically interrupted to form an elongate discontinuous reflective surface.

An important feature of the invention is the provision of reflection means applied to the recessed marker surface 22 for at least partially reflecting incident light in the direction of the source of the incident light on the roadway. Although any one of numerous reflective materials may be used, it is presently preferred that retroreflective materials be applied to the recessed marker surface 22, such as reflective glass beads 24. Prismatic materials (sheeting) can also be used to provide retroreflectivity. Glass beads, because of their spherical configuration, have a much larger range of entrance angles for which retroreflectivity will be exhibited. The use of retroreflective materials and, glass beads, in particular, are well known to those skilled in the art.

However, the ability to resist dislodging forces, (e.g. abrasion, freeze thaw cycling, expansion coefficient differences and lack of adhering qualities—either adhesive, cohesive or mechanical) is enhanced as a result of the method used to attach the microspheres to the marker surface 22 as will now be described.

In this connection, the following definitions come into play:

(a) Adhesive Adhesion: the ability to stick together; the force that holds unlike molecules of substances together. Examples—tape, glue, caulking;

(b) Cohesive Adhesion: the force which unites and cleaves together molecules of like or similar materials. Examples—polyester on polyester, caulking onto caulking, etc.;

(c) Mechanical Adhesion: action whereby one material stays in intimate contact with another because of a physical constraint or blocking action. Example: a sphere buried more than 50% in another solid where no sticking takes place but wherein the base surrounds the sphere to the depth of its embedment.

(d) Coupling: to link or connect intimately through a chemical reaction of dissimilar molecules, especially between organic and inorganic materials. Example—polyester to silica sand, polyester to fiberglass, etc.

Referring to FIGS. 1A and 1B, the placement, retention and durability of glass retroreflective beads 24 into a adhesive matrix base such as a polyester matrix 25 of the marker surface 22 is shown. The beads 24 can also be placed into a base of pigmented epoxy, methyl methacrylate or a combination of these materials. The ability to make the beads 24 stick to the matrix and continue the uninterrupted retroflective quality of the beads in spite of normal and abnormal conditions thrust upon it is a feature not found in other devices.

The beads stick 24 to the matrix 25 because of the adhesive, cohesive and mechanical procedures applied. Skilled application techniques have been developed to control proper placement and embedment, working in a sympathetic reactive organic base.

When a catalyzed polymer liquid base coat having a thickness "t" gauged to the proportional thickness or diameter "D" of a reflective bead is applied either to a cementitious or polymer concrete base wherein a proper cohesive or adhesive bond is created between this liquid and the base, a configured area (strip or other shape), creates a retroreflective device upon the hardening (setting) of said liquid base.

The microspheres or microbeads 24 are applied (while the base is still liquid) into the liquid to the gauged depth of more than 50% of the vertical radius thus seating the bead sphere 24 into the liquid 25 wherein a mechanical bond is created.

Further, because of the "silane" coupling occurring between the bead 24 and the liquid base 25 (upon hardening) an actual coupling bond is created, thus giving additional retention strength to the "union".

A further process can be added by recessing the area to be retroreflectorized. This gives protection from scuffing and abrasion.

As can be determined, by the use of these foregoing techniques, the strip or other configuration of the beads does not rely on the cementitious or polymer concrete structure which is to be retroreflectorized.

The facing panel 16 is shown in FIG. 1 to have a length 26, a thickness 27, and a height 28. These dimensions of the facing panel are not critical. For curb applications, the height of the facing panel 16 can, for example, be between 12 to 18" in height and 4-8' in length. Since highways and roads can exend for many miles, a plurality of such facing panels 16, each of which is pre-cast, may be arranged end-to-end to each other to form a substantially continuous barrier, and the recessed marker surfaces aligned with each other to form a substantially continuous reflective delineator. In the case of cast in place concrete versions of the invention, it is possible, in theory, to use a continuous roadway member extending along the entire length of the highway or road.

As above noted, the elongate recessed marker surface 22 is inclined in relation to the horizontal to cause water run-off to prevent the "mirror" effect and a deterioration of the retroreflective properties of the reflecting material. In order to eliminate or minimize this "mirror" effect, it is imperative that any rain or water which comes into contact with the reflective material be prevented from accummulating and covering the reflective material. Referring to FIGS. 2-5, four different examples are shown in which the recessed marker surfaces 22a-22d are inclined at successively smaller angles $\theta_a$-$\theta_d$ in relation to the horizontal. The facing panels 10a-10d are all effective in draining the rain or water from the reflective surfaces. Clearly, the greater the angle in relation to the horizontal, the more rapid the run-off and, therefore, the less likely of any appreciable accummulation of water covering the reflective material during heavy rain. The inclination of the recessed marker surfaces 22a-22d also has the advantageous feature that water run-off washes or cleans the reflective surface, such as the reflective beads, and this self-cleaning action maintains the reflective surface at optimum or near-optimum reflecting condition.

Referring to FIGS. 6-10, five typical roadway structures 10e-10i are shown, each of which is formed by cast in-place concrete to which one or more pre-cast polymer concrete facing panels 16 are attached each with a recessed marker surface 22a. In the case of FIG. 10, the roadway member 10i is provided with an upper facing panel 16a and a lower facing panel 16b to provide elongate vertically spaced roadway delineators in accordance with the present invention. As will be noted from FIGS. 6-10, the present invention is extremely flexible and can be used in connection with almost every roadway member irrespective of size or shape. FIGS. 11-15 are similar to FIGS. 6-10 and illustrate the same types of roadway members. However, separate facing panels are not used in FIGS. 11-15. Instead, the recessed marker surfaces 22a and 22c are formed directly in the cast-in-place concrete members. This can be done during the molding process for new installations. To modify an existing installation, any conventional equipment, such as grinders, can be used to remove a thickness of the concrete to produce the recessed marker surfaces. The roadway structures in FIGS. 10-11 are designated by references 10e'-10i', which correspond to the roadway members 10e-10i in FIGS. 6-10.

Figure 17:
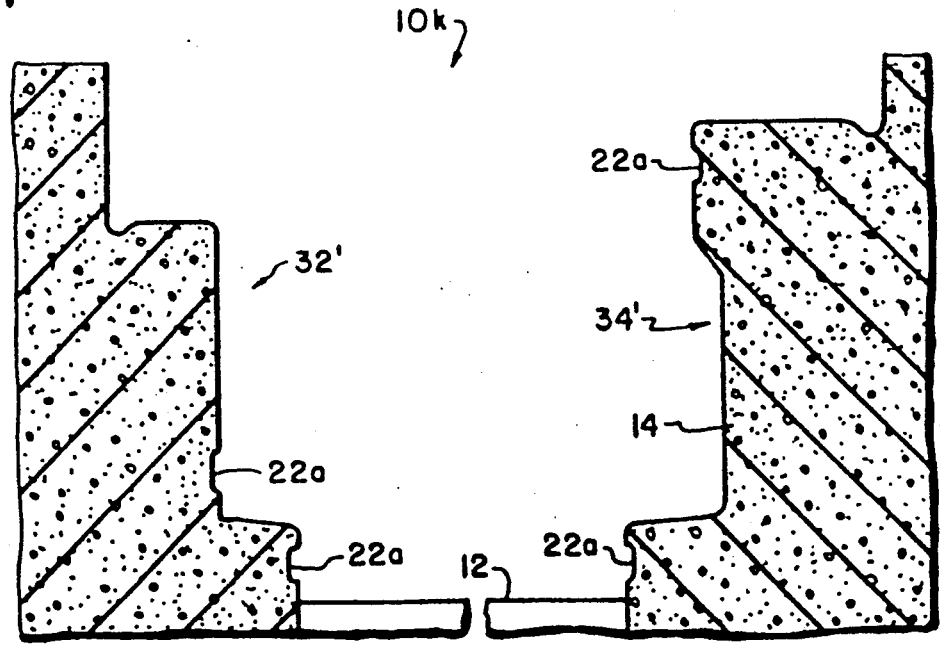
FIG. 17 is similar to FIG. 16, except that the elongate marker surfaces are formed directly in the cast-in-place concrete.

In FIG. 16, there is shown a tunnel 10j through which the roadway 12 passes. For purposes of illustration, a low bench panel 32 is shown with a first reflective surface 22a substantially at the level of the roadway 12, and a second reflective surface 22a just above the first reflective surface. The positions of the reflective surfaces is not critical for the purposes of the present invention and their locations will vary depending on the application. In the case of the high bench panel 34, a first reflective surface 22a is formed in the facing panel 16a in the upper region of the bench panel 34. A second reflective surface 22a is formed in the lower facing panel 16b which is substantially at the level of the roadway 12. In FIG. 17, low bench panel 32' corresponds to the panel 32 in FIG. 16 and the high bench panel 34' corresponds to the bench panel 34 in FIG. 16. The tunnel 10k constructions are similar, therefore, to those in FIG. 16 with the exception that the reflective surfaces are formed directly in the concrete and separate facing panels are not utilized.

Figure 18:
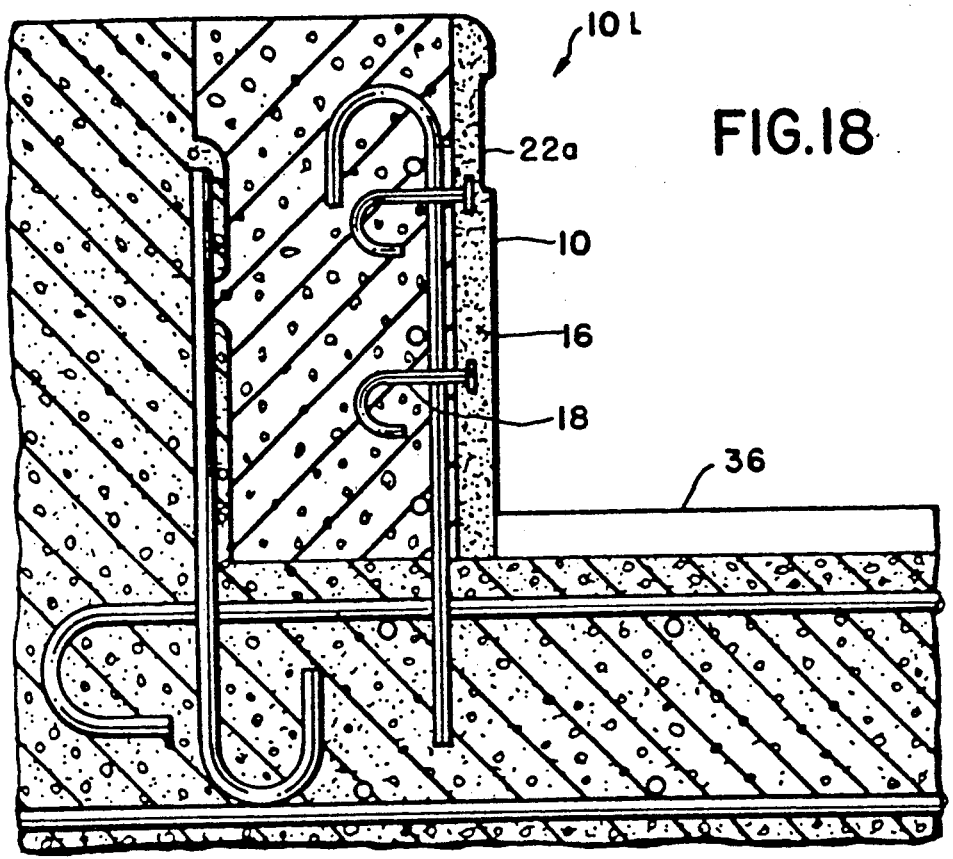
FIG. 18 is a front elevation view, in section, of a typical construction of a bridge rail or pedestrian walkway, showing how a curb facing in accordance with the present invention may be attached to the cast-in-place concrete curb.
Figure 19:
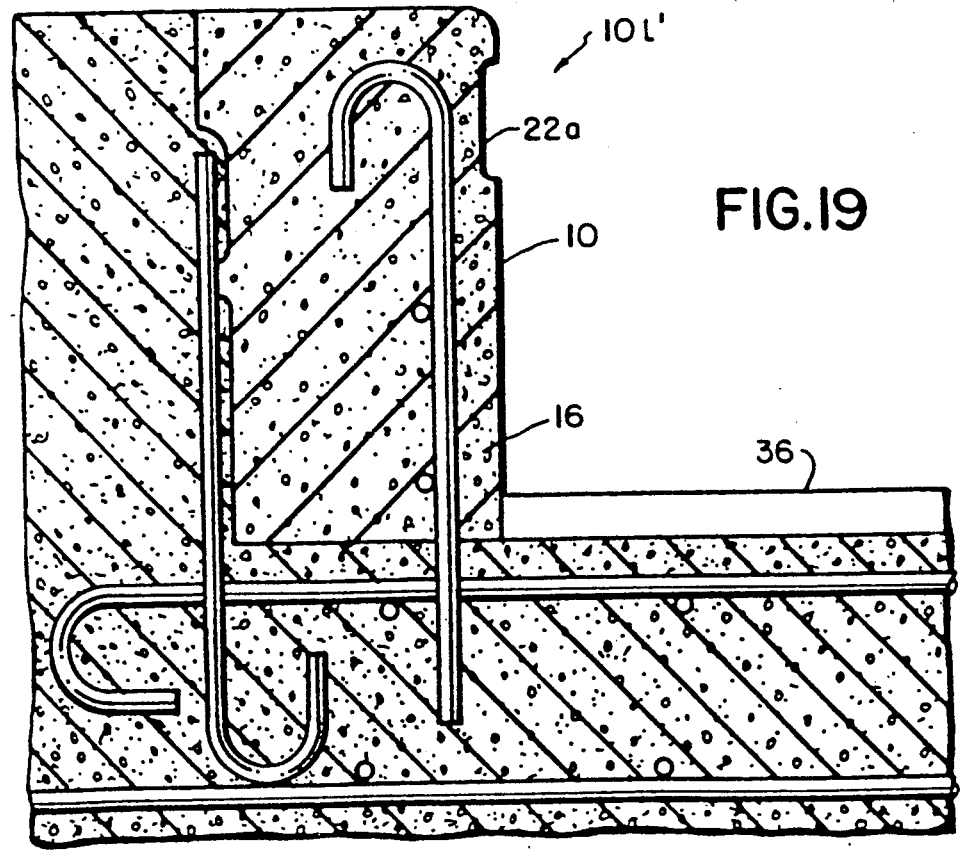
FIG. 19 is similar to FIG. 18, except that the elongate marker surface is provided and recessed directly in the cast-in-place concrete structure.

Referring to FIGS. 18 and 19, bridge rail and pedestrian walkways 101 and 101' are shown which are similar in construction to the curb constructions shown in FIG. 1. In FIG. 18, a polymer concrete facing panel 16 is utilized, while in FIG. 19, the reflecting surface 22a is formed directly in the concrete. Also shown in these figures is an overlay 36 which is applied to the roadway after the curb facing panel 16 is attached by means of anchors 18 or other suitable means to the roadway.

Figure 21:
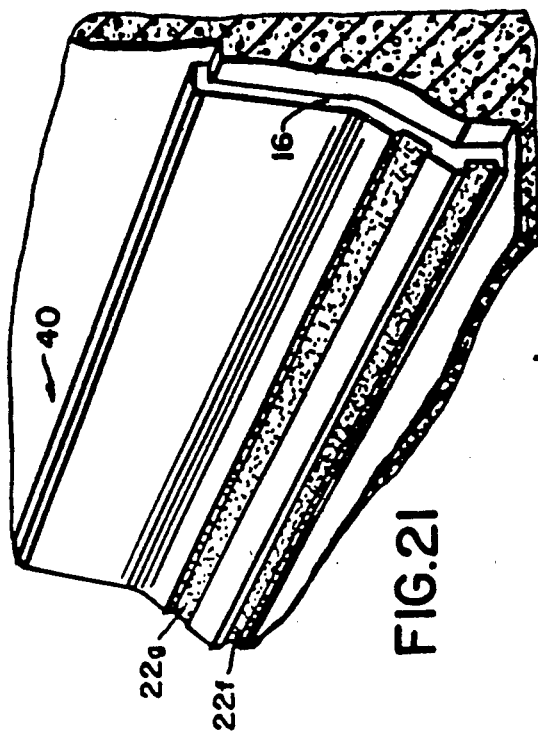
FIG. 21 a perspective view of a one-sided median barrier of the type which faces a single lane, shown abutting against a concrete wall, and showing two elongate recessed marker surfaces, the lower one of which is vertical, and the higher one of which is inclined at an angle in relation to the horizontal.
Figure 20:
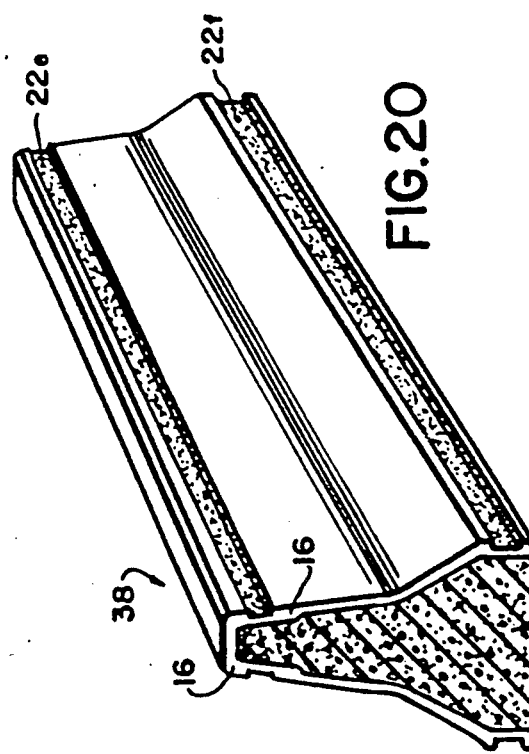
FIG. 20 is a perspective view of a two-sided median barrier of the type used as a divider between lanes, showing upper and lower elongate recessed marker surfaces on each side of the median barrier and also shown filled with concrete.

Referring to FIGS. 20 and 21, there are shown pre-cast polymer concrete median barriers 38 and 40. In FIG. 20, the median barrier 38 is a two-sided median barrier which can be used as a divider between lanes. Being pre-cast and transported to the site of use, the median barrier 38 is advantageously initially made hollow to reduce its weight and filled with concrete 14 at the site. The barrier 38 is provided with an upper marker surface 22e and a lower marker surface 22f, these being provided on each side of the median barrier so that similar roadway delineators are visible in each of the lanes separated by the barrier. In FIG. 21, a one-sided median barrier 40 is shown which faces only one lane, and may abut against a concrete wall or the like. Here, the median barrier 40 is provided with a lower marker surface 22f and a slightly higher marker surface 22g which is inclined at an angle less than 90° from the horizontal. It should be clear that one, two or more marker surfaces may be provided on each roadway member oriented and spaced from each other in any desired fashion.

Figure 23:
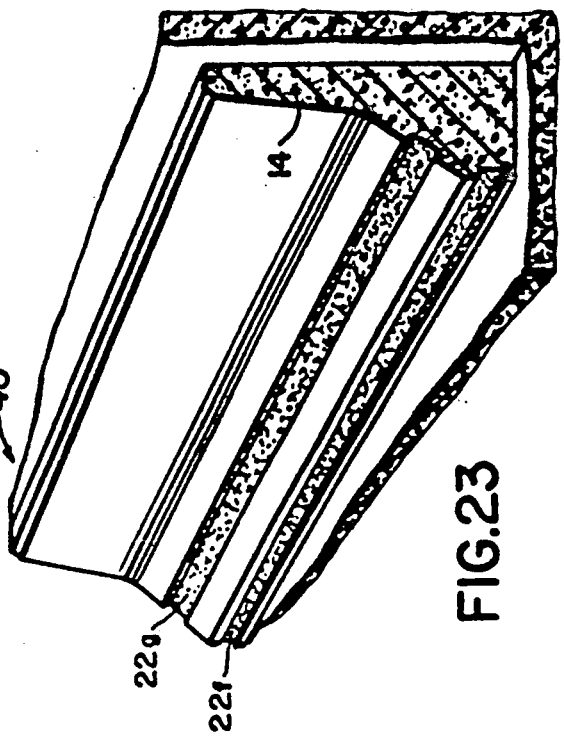
FIGS. 22 and 23 are similar to FIGS. 20 and 21, except that the recessed elongate marker surfaces are formed directly in cast in-place concrete.
Figure 22:
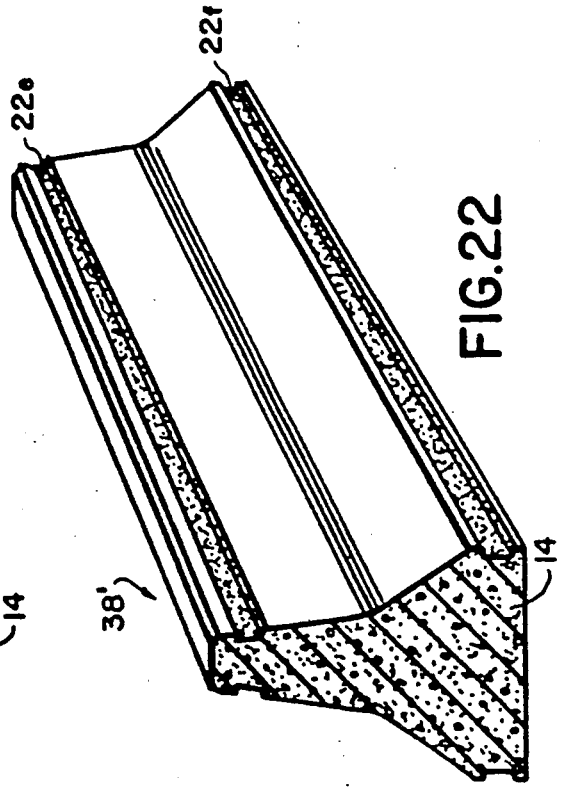

In FIGS. 22 and 23, median barriers 38' and 40' are shown which are similar to those shown in FIGS. 20 and 21, respectively, except that the median barriers are formed of cast-in-place concrete and the recessed marker surfaces are formed directly in the concrete without the use of separate facing panels.

While preferred embodiments of the invention have been shown and described herein, it is obvious that numerous additions, changes and omissions may be made in the invention without departing from the spirit and scope thereof. Thus, for example, while it is presently preferred that the marker surfaces be inclined in relation to the horizontal at an angle of at least 45°, any suitable angle selected for a particular application may be used.

What is claimed is:

1. A safety roadway delineator comprising a member having an exterior surface facing the roadway and exposed to roadway traffic, said member being provided with a generally elongate marker surface recessed in relation to said exterior surface, said marker surface extending along the length direction of said roadway member and in use being inclined in relation to the horizontal to cause a water run-off; microsphere reflectors applied to said recessed marker surface for at least partially reflecting incident light in the direction of the source of incident light on the roadway; and an adhesive matrix base for substantially permanently attaching said microsphere reflectors to said marker surface by means of mechanical and non-mechanical adhesion, said microsphere reflectors defining an average microsphere reflector diameter, said microsphere reflectors being embedded within said adhesive matrix base a depth selected from the range of 51-80% of the average microsphere reflector diameter, whereby said member may serve as a roadway member forming a substantially continuous reflective delineator which is protected from normal wear and reliably exhibits reflecting properties both under dry and rainy weather conditions.

2. A safety roadway delineator as defined in claim 1, wherein said attaching means comprises a material selected from the following group: epoxy; polyester matrix; methyl methacrylate; and a mixture of epoxy and methyl methacrylate.

3. A safety roadway delineator as defined in claim 2, further comprising pigments added to said material to provide desired coloring of said attachment means and produce desired reflected light color properties.

4. A safety roadway delineator as defined in claim 1, wherein said microsphere reflection means comprises microspheres or beads having an average diameter D, said attachment means comprising a layer or coat having a thickness greater than 50% of the average bead diameter D to provide said mechanical adhesion.

5. A safety roadway delineator as defined in claim 4, wherein the thickness of said layer or coat is selected from the range of 51-80% of the average bead diameter.

6. A safety roadway delineator as defined in claim 1, wherein said member is formed of a cementitious material, and said attachment means is applied to said cementitious material, said microsphere reflection means being retained to said member by said attachment means without penetration of said member.

7. A safety roadway delineator as defined in claim 1, further comprising an elongate roadway member forming a highway barrier, and comprising further attachment means for attaching said member to said roadway member.

8. A safety roadway delineator as claimed in claim 1, wherein said adhesive matrix base includes means for creating non-mechanical adhesive adhesion with said microsphere reflectors.

9. A safety roadway delineator as claimed in claim 8, wherein said adhesive matrix base includes means for creating non-mechanical cohesive adhesion with said microsphere reflectors.

10. A safety roadway delineator as claimed in claim 9, wherein said microsphere reflectors comprises glass beads, said adhesive matrix base comprises a polyester matrix, and said means for creating cohesive adhesion comprises silane as a coupling agent between said glass beads and said polyester matrix.

11. A safety roadway delineator as claimed in claim 1, wherein said adhesive matrix base includes means for creating non-mechanical cohesive adhesion with said microsphere reflectors.

12. A safety roadway delineator as claimed in claim 11, wherein said microsphere reflectors comprises glass beads, said adhesive matrix base includes a polyester matrix, and said means for creating cohesive adhesion comprises silane as a coupling agent between said glass beads and said polyester matrix.

* * * * *